(12) United States Patent
Izumi

(10) Patent No.: US 10,556,295 B2
(45) Date of Patent: Feb. 11, 2020

(54) LASER MACHINING DEVICE THAT DETECTS CONTAMINATION OF OPTICAL SYSTEM BEFORE LASER MACHINING

(71) Applicant: FANUC CORPORATION, Minamitsuru-gun, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/105,592

(22) Filed: Aug. 20, 2018

(65) Prior Publication Data

US 2019/0061066 A1   Feb. 28, 2019

(30) Foreign Application Priority Data

Aug. 23, 2017   (JP) ................................ 2017-160441

(51) Int. Cl.
| | | |
|---|---|---|
| *B23K 26/70* | (2014.01) | |
| *B23K 26/064* | (2014.01) | |
| *B23K 26/08* | (2014.01) | |

(52) U.S. Cl.
CPC .......... *B23K 26/707* (2015.10); *B23K 26/064* (2015.10); *B23K 26/08* (2013.01); *B23K 26/703* (2015.10)

(58) Field of Classification Search
CPC ................ B23K 26/046; B23K 26/064; B23K 26/0647; B23K 26/0648; B23K 26/066; B23K 26/08; B23K 26/703; B23K 26/705; B23K 26/707

USPC ...................................................... 219/121.73
See application file for complete search history.

(56) References Cited

U.S. PATENT DOCUMENTS

| | | | |
|---|---|---|---|
| 9,304,036 B2 * | 4/2016 | Izumi .................... | G01J 1/4257 |
| 9,776,280 B2 | 10/2017 | Ogura et al. | |
| 2005/0115940 A1 * | 6/2005 | Matsushita .......... | G01J 1/4257 |
| | | | 219/121.83 |
| 2006/0274794 A1 * | 12/2006 | Watanabe ............ | B23K 26/032 |
| | | | 372/29.02 |
| 2007/0000889 A1 * | 1/2007 | Yamazaki .............. | B23K 26/04 |
| | | | 219/121.83 |
| 2010/0245830 A1 * | 9/2010 | Ito ........................ | H01S 3/0014 |
| | | | 356/447 |

(Continued)

FOREIGN PATENT DOCUMENTS

| | | |
|---|---|---|
| JP | S6066227 A | 4/1985 |
| JP | S63016889 A | 1/1988 |

(Continued)

*Primary Examiner* — Dana Ross
*Assistant Examiner* — Joe E Mills, Jr.
(74) *Attorney, Agent, or Firm* — RatnerPrestia

(57) ABSTRACT

A laser machining device includes a contamination determining part that determines contamination of an external optical system before laser machining; the contamination determining part includes a lens contamination determining section that determines contamination of a lens in the external optical system on the basis of a comparison between a first measurement value, which is measured by an energy amount measuring part in a state where the external optical system is not heated, and a second measurement value, which is measured by the energy amount measuring part in a state where the external optical system is heated.

8 Claims, 8 Drawing Sheets

(56) References Cited

U.S. PATENT DOCUMENTS

| | | | | |
|---|---|---|---|---|
| 2014/0226959 A1* | 8/2014 | Sibeud | ................... | C21D 1/04 |
| | | | | 392/418 |
| 2015/0276473 A1* | 10/2015 | Izumi | ................... | G01J 1/4257 |
| | | | | 356/121 |
| 2018/0151048 A1* | 5/2018 | Winkler | ............... | B22F 3/1055 |

FOREIGN PATENT DOCUMENTS

| | | |
|---|---|---|
| JP | S63016890 A | 1/1988 |
| JP | H01178393 A | 7/1989 |
| JP | 2016-002580 A | 1/2016 |
| JP | 2016097412 A | 5/2016 |
| WO | 2009/066370 A1 | 5/2009 |

\* cited by examiner

LASER MACHINING DEVICE THAT DETECTS CONTAMINATION OF OPTICAL SYSTEM BEFORE LASER MACHINING

CROSS-REFERENCE TO RELATED APPLICATION

This application is a new U.S. Patent Application that claims benefit of Japanese Patent Application No. 2017-160441, filed Aug. 23, 2017, the disclosure of this application is being incorporated herein by reference in its entirety for all purposes.

BACKGROUND OF THE INVENTION

1. Field of the Invention

The present invention relates to a laser machining device, and particularly relates to a laser machining device that detects contamination of an optical system before laser machining.

2. Description of the Related Art

A laser machining device that performs laser machining on a workpiece by irradiating the workpiece with a laser beam focuses the laser beam onto a predetermined focus position using a lens and irradiates the workpiece with the focused laser beam. In such a laser machining device, in a case where an external optical system that guides a laser beam from a laser oscillator to focus the laser beam onto the surface of the workpiece becomes contaminated and absorbs the laser beam, a so-called thermal lens effect will occur, which alters the curvature and causes the focus position to move. Depending on a type of the contamination, the transmissibility of the external optical system will also change. In a case where changes in the focus position and changes in the transmissibility arise, machining problems will occur, and thus it is necessary to confirm that the external optical system is not contaminated. This interferes with automated operations.

Detecting contamination of the external optical system by attaching a temperature sensor, a scattered light sensor, etc., is known as a way of addressing this issue. Although not discussing an external optical system, WO 2009/066370 (A1) pamphlet discloses a laser machining device capable of determining degradation and the like in a coating layer of an emission mirror in a laser oscillator. Due to the degradation, the emission mirror will absorb the laser beam and enter a state of thermal load, which changes the curvature and results in the so-called thermal lens effect; as a result, parallel beams have a tendency to be focused. A laser machining device includes an aperture arranged behind an emission mirror and a beam power measurement sensor arranged behind the aperture, and determines degradation in the emission mirror when the beam power is greater than a reference value.

Although not detecting before laser machining, JP 2016-2580 A discloses a laser machining device capable of detecting shifting in a focus position caused by the thermal lens effect in an external optical system after machining. In a case where focal point shifting occurs due to the thermal lens effect, the laser irradiation diameter will become larger; the laser machining device includes a measurement reference plane having a small opening, and focal point shifting is detected on the basis of a level of radiated light radiated from the periphery of the small opening.

SUMMARY OF THE INVENTION

An external optical system degrades over time. A loss of laser power occurs at the beam focus position as a result. Even a small degree of contamination will move the focus position, which leads to a dramatic drop in the quality of the laser machining. In this case, it is necessary to quickly replace or clean the optical components. However, there is a problem with maintenance of optical components after machining problems have occurred in that many defective products are produced when carrying out automated operations. On the other hand, the method of attaching a temperature sensor, a scattered light sensor, etc., to the external optical system has a problem in that such sensors cannot be retrofitted. Furthermore, not all external optical systems can accept sensors capable of detecting contamination, which limits a user's freedom of selection.

What is needed, therefore, is a technique enabling the automatic detection of contamination of an external optical system before laser machining, using a configuration that can be retrofitted to an existing laser machining device.

One aspect of the present disclosure provides a laser machining device that performs laser machining on a workpiece after detecting contamination of an optical system, the device including: a laser oscillator; an external optical system configured to guide a laser beam from the laser oscillator to focus the laser beam on a surface of the workpiece; a drive control unit configured to move a focus position and an optical axis of the laser beam emitted from the external optical system; a cooling control unit configured to control cooling of the external optical system; a plate having a small-diameter hole and being capable of absorbing the laser beam; an energy amount measuring part configured to measure an energy amount of the laser beam absorbed by the plate; a laser beam elimination part capable of removing the laser beam passing through the small-diameter hole; and a contamination determining part configured to determine contamination of the external optical system before laser machining, wherein the contamination determining part includes: a cooling stop commanding section configured to command the cooling control unit to stop cooling the external optical system; a drive commanding section configured to command the drive control unit to adjust the focus position on a surface of the plate and align the optical axis of the laser beam with a center of the small-diameter hole; a low power commanding section configured to command the laser oscillator to emit the laser beam with a low power to the extent that the plate is not melted or deformed; and a lens contamination determining part configured to determine contamination of a lens in the external optical system, based on a comparison between a first measurement value, the first measurement value being measured by the energy amount measuring part within a laser emission start period in which the external optical system is not heated, and a second measurement value, the second measurement value being measured by the energy amount measuring part within a set time elapsed period in which the external optical system is heated.

Another aspect of the present disclosure provides a laser machining device that performs laser machining on a workpiece after detecting contamination of an optical system, the device including: a laser oscillator; an external optical system configured to guide a laser beam from the laser oscillator to focus the laser beam on a surface of the workpiece; a drive control unit configured to move a focus position and an optical axis of the laser beam emitted from the external optical system; a plate having a small-diameter hole; an energy amount measuring part configured to measure an energy amount of the laser beam passing through the small-diameter hole; a laser beam elimination part arranged in a location different from the plate and capable of removing the laser beam; and a contamination determining part configured to determine contamination of the external optical system before laser machining, wherein the contamination determining part includes: a first drive commanding section configured to command the drive control unit to adjust the focus position on a surface of the plate and align the optical axis of the laser beam with a center of the small-diameter hole before the external optical system is heated; a first low power commanding section configured to command the laser oscillator to emit the laser beam with a low power to the extent that the plate is not melted or deformed; a high power commanding section configured to command the laser oscillator to emit the laser beam toward the laser beam elimination part with a high power to the extent used for laser machining, in order to heat the external optical system; a second drive commanding section configured to command the drive control unit to adjust the focus position on the surface of the plate and align the optical axis of the laser beam with the center of the small-diameter hole after the external optical system has been heated; a second low power commanding section configured to command the laser oscillator to emit the laser beam with a low power to the extent that the plate is not melted or deformed, in a state where the external optical system is heated; and a lens contamination determining part configured to determine contamination of a lens in the external optical system on the basis of a comparison between a first measurement value, the first measurement value being measured by the energy amount measuring part in a state where the external optical system is not heated, and a second measurement value, the second measurement value being measured by the energy amount measuring part in a state where the external optical system is heated.

DETAILED DESCRIPTION

Figure 1:
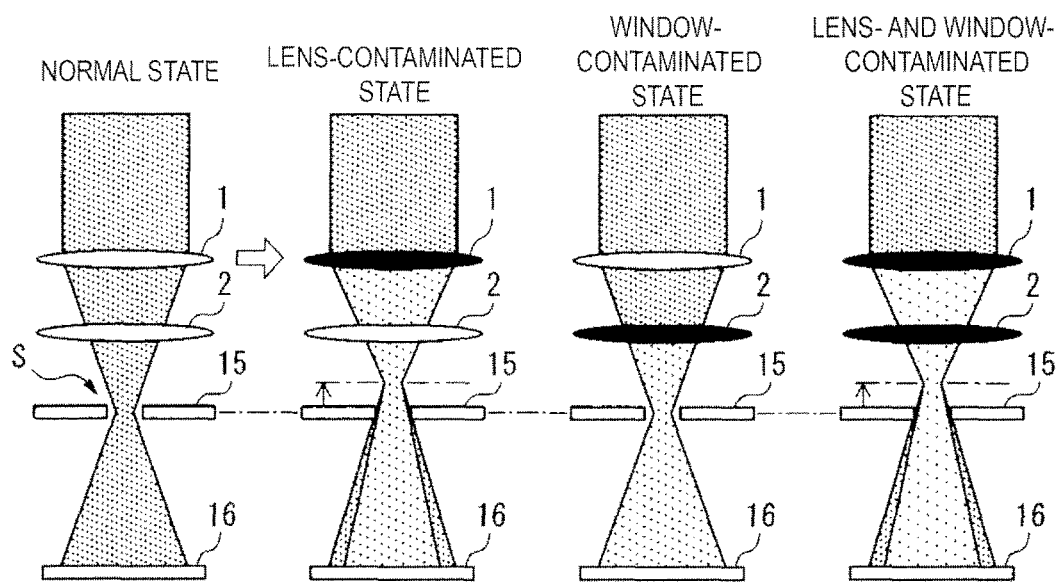
FIG. 1 is a schematic diagram illustrating contamination levels of an external optical system.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

Terms used in this specification will be defined next. The term "lens" in this specification refers to an optical component including a surface having a curvature. In other words, "lens" as used in this specification refers to an optical component that, when a laser beam is absorbed due to contamination, undergoes a large change in curvature under the so-called thermal lens effect. The term "window" in this specification refers to an optical component having a substantially flat surface. In other words, "window" as used in this specification refers to an optical component that, even when a laser beam is absorbed due to contamination, undergoes a small change in curvature. Furthermore, the term "contamination" in this specification includes not only a state in which dust has simply accumulated, but also a state where accumulated dust has been burned to be stain in a dot pattern by a laser beam, a state where a thin film provided on a mirror, etc., has peeled off and degraded, etc.

FIG. 1 is a schematic diagram illustrating types of contamination of an external optical system. Although not limited to this configuration, the external optical system includes a lens 1 for focusing a laser beam onto the surface of a workpiece and a window 2 disposed on the outermost side of the external optical system. When, in a state where a focus position is adjusted on a surface of a plate 15 having a small-diameter hole S and the optical axis of the laser beam is made coincide with the center of the small-diameter hole S, a laser beam is emitted from the external optical system, the laser beam will pass through the small-diameter hole without being blocked by the plate 15 in the periphery of the small-diameter hole S when the lens 1 and the window 2 are in normal, uncontaminated states. Thus, an energy amount of the laser beam measured by an energy amount measuring part 16 arranged below the plate 15 will be maximum. However, in a lens-contaminated state where only the lens 1 is contaminated, the thermal lens effect in the lens 1 will cause the focus position to move upward (or downward), and the laser beam will be blocked by the plate 15 in the periphery of the small-diameter hole; as a result, the energy amount of the laser beam measured by the energy amount measuring part 16 will decrease slightly. Furthermore, in a window-contaminated state where only the window 2 is contaminated, the thermal lens effect does not arise and the focus position thus does not move; accordingly, the laser beam is not blocked by the plate 15 in the periphery of the small-diameter hole. However, in a case where a thin layer of dust has accumulated on the surface of the window 2, the window 2 will absorb the laser beam, and the energy amount of the laser beam measured by the energy amount measuring part 16 will decrease. In a case where dust is burned into the surface of the window 2 to be stain in a dot pattern, the window 2 will cause the laser beam to scatter, and thus energy amount of the laser beam measured by the energy amount measuring part 16 will ultimately decrease. Additionally, in a case where both the lens 1 and the window 2 are contaminated, not only will the thermal lens effect in the lens 1 cause the focus position to move and result in the laser beam being blocked by the plate 15 in the periphery of the small-diameter hole S, but the laser beam will also be absorbed or scattered by the window 2, and thus the energy amount of the laser beam measured by the energy amount measuring part 16 will be minimum.

Figure 2:
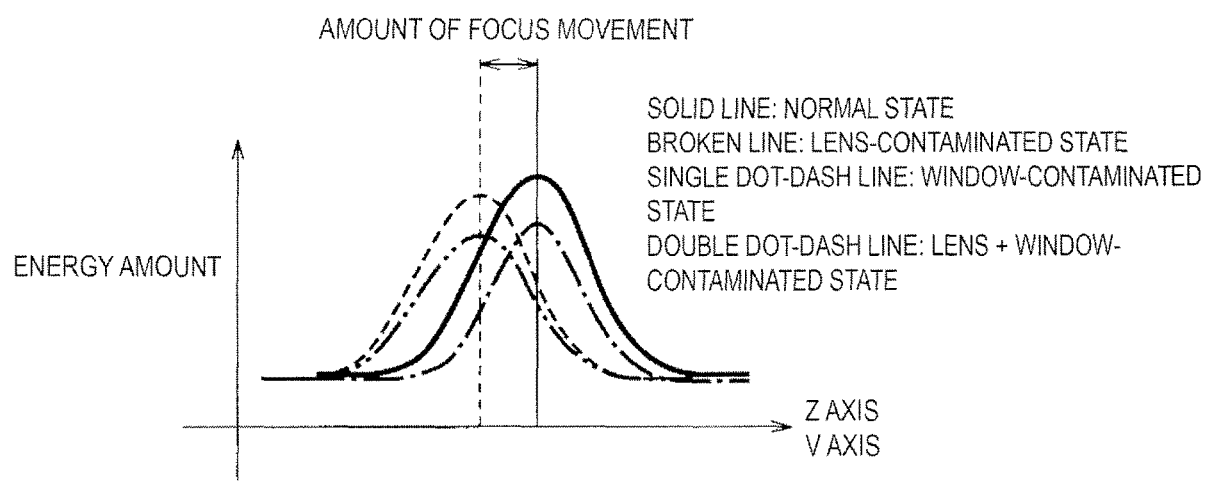
FIG. 2 is a graph illustrating a relationship between an amount of focus movement based on a contamination level, and an energy amount of a laser beam passing through a small-diameter hole.

FIG. 2 is a graph illustrating a relationship between an amount of focus movement based on the type of contamination, and the energy amount of the laser beam passing through the small-diameter hole. As described above, compared to the normal state represented by a solid line, the lens-contaminated state represented by the broken line indicates that the focus position has moved and the energy amount has decreased slightly. In the window-contaminated state represented by the single dot-dash line, the focus position does not move, but there is a decreased energy amount. Furthermore, in the lens- and window-contaminated state represented by the double dot-dash line, the focus position moves and the energy amount is minimum. As such, the thermal lens effect occurs in a state where the external optical system has been heated by a laser beam with a high power to the extent used for laser machining, which causes the focus position to move, but in a state where the external optical system is not heated, the thermal lens effect will not occur and thus the focus position will not move, even in the case where the lens is contaminated; contamination of the lens can therefore be detected before the laser machining by comparing the laser beam energy amounts in these two states. The laser machining device according to the present embodiment detects contamination of the external optical system using this physical phenomenon.

Figure 3:
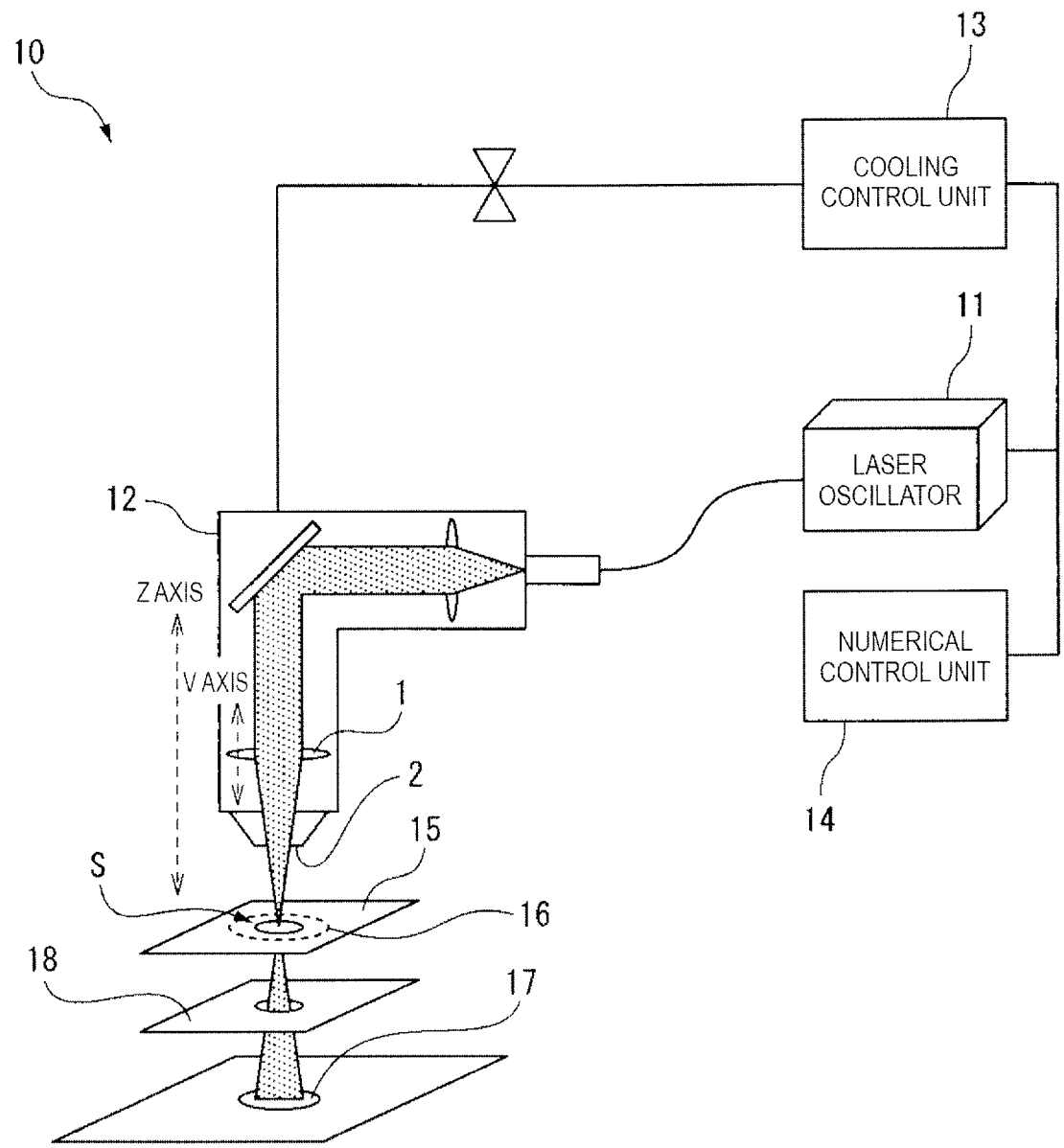
FIG. 3 is a schematic diagram illustrating the overall configuration of a laser machining device according to one embodiment.

FIG. 3 is a schematic diagram illustrating the overall configuration of a laser machining device 10 according to the present embodiment. The laser machining device 10 includes: a laser oscillator 11; an external optical system 12 for guiding a laser beam from the laser oscillator 11 to focus the laser beam onto the surface of a workpiece; a cooling control unit 13 that controls cooling of the external optical system 12 through a water-cooling or air-cooling system; and a numerical control unit 14 that controls the laser machining device 10 as a whole. The laser machining device 10 further includes: the plate 15, made of aluminum, which is arranged on an outer side of a machining table, has the small-diameter hole S which is, for example, 0.5 mm, and is subjected to an anodizing treatment so as to absorb the laser beam; the energy amount measuring part 16, which is arranged in the periphery of the small-diameter hole S on a bottom face of the plate 15, and which measures the energy amount of the laser beam absorbed by the plate 15; and a laser beam elimination part 17 capable of removing the laser beam that has passed through the small-diameter hole S so that reflected light or radiated heat from the laser beam passing through the small-diameter hole does not return to the plate 15. The energy amount measuring part 16 may be an annular thermocouple that measures a heat amount of the laser beam absorbed by the plate 15, or may be a power sensor that measures the power of the laser beam absorbed by the plate 15. The laser beam elimination part 17 may be an anodized aluminum plate, or may be an optical system such as a mirror that reflects the laser beam passing through the small-diameter hole to a different location so that the laser beam does not return to the plate 15. Preferably, the laser machining device 10 further includes a shielding part 18 arranged between the plate 15 and the laser beam elimination part 17, which shields reflected light or radiated heat coming from the laser beam elimination part 17.

Figure 4:
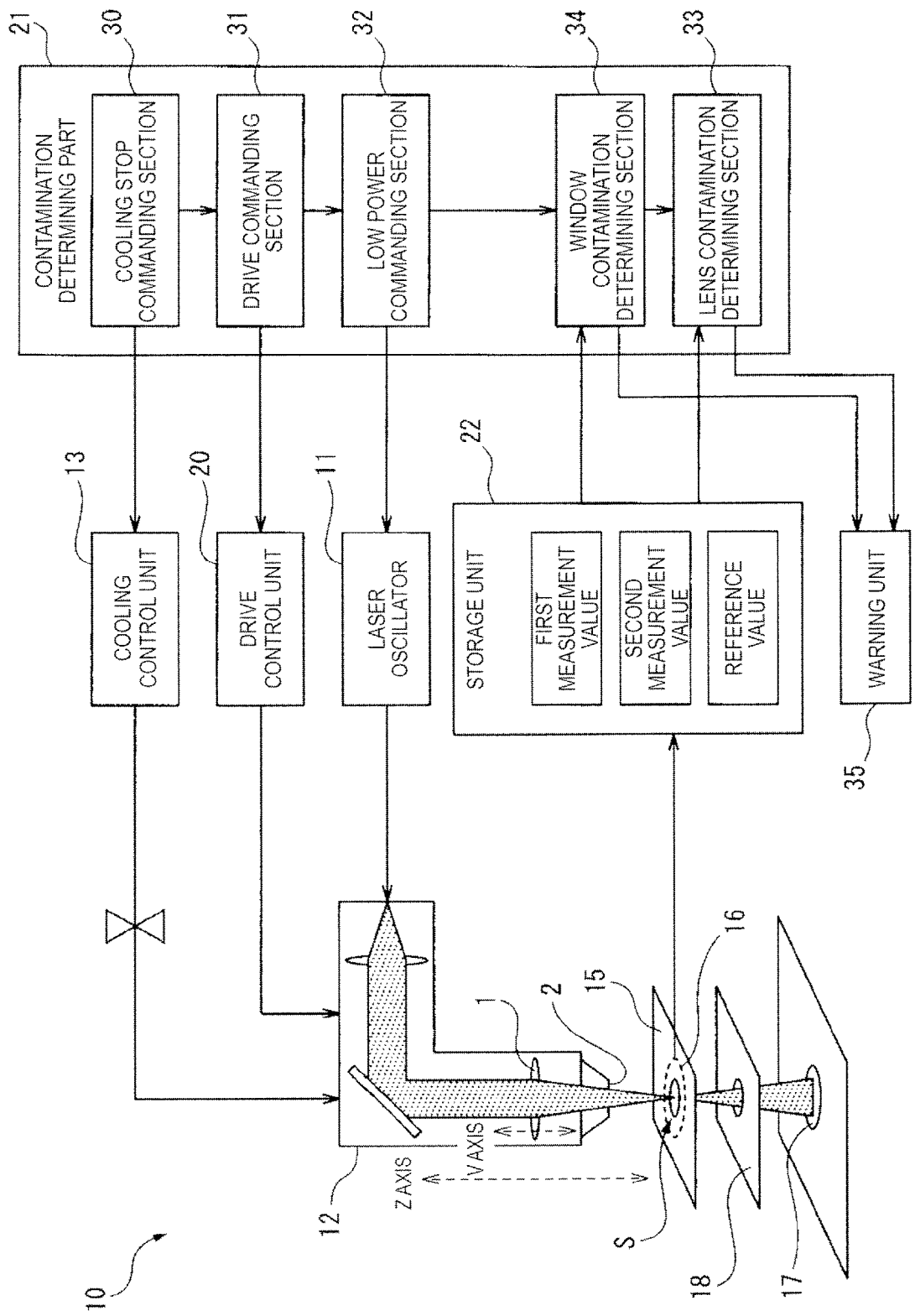
FIG. 4 is a block diagram illustrating the configuration of the laser machining device according to one embodiment.

FIG. 4 is a block diagram illustrating the configuration of the laser machining device 10 according to the present embodiment. The laser machining device 10 further includes: a drive control unit 20 for moving the focus position and optical axis of the laser beam emitted from the external optical system 12; a contamination determining part 21, constituted by a semiconductor integrated circuit such as an ASIC or a FPGA or a program executable by a computer, that determines contamination of the external optical system 12 before the laser machining; and a storage section 22 that stores various types of data. The contamination determining part 21 includes: a cooling stop commanding section 30 that commands the cooling control unit 13 to stop the cooling of the external optical system 12; a drive commanding section 31 that commands the drive control unit 20 to adjust the focus position on the surface of the plate 15 and to align the optical axis of the laser beam with the center of the small-diameter hole S; and a low power commanding section 32 that commands the laser oscillator 11 to emit the laser beam with a low power (e.g., 50 W) to the extent that the plate 15 is not melted or deformed. The contamination determining part 21 further includes a lens contamination determining section 33 that determines contamination of the lens 1 in the external optical system 12 on the basis of a comparison between a first measurement value, which is measured by the energy amount measuring part 16 within a laser emission start period in which the external optical system 12 is not heated (e.g., from the start of laser emission to five seconds thereafter), and a second measurement value, which is measured by the energy amount measuring part 16 within a set time elapsed period in which the external optical system 12 is heated (e.g., from the start of laser emission to 120 seconds thereafter). Although an optional component, the contamination determining part 21 may further include a window contamination determining section 34 that determines contamination of the window 2 in the external optical system 12 on the basis of the first measurement value and a predetermined reference value pertaining to the first measurement value. The first measurement value, the second measurement value, and the reference value are stored in the storage section 22. The laser machining device 10 further includes a warning unit 35 that issues a warning message in a case where the lens contamination determining section 33 or the window contamination determining section 34 has determined that the external optical system 12 is contaminated. The warning unit 35 may be a warning lamp, or may be a monitor that displays a warning message in an operation panel.

Figure 5:
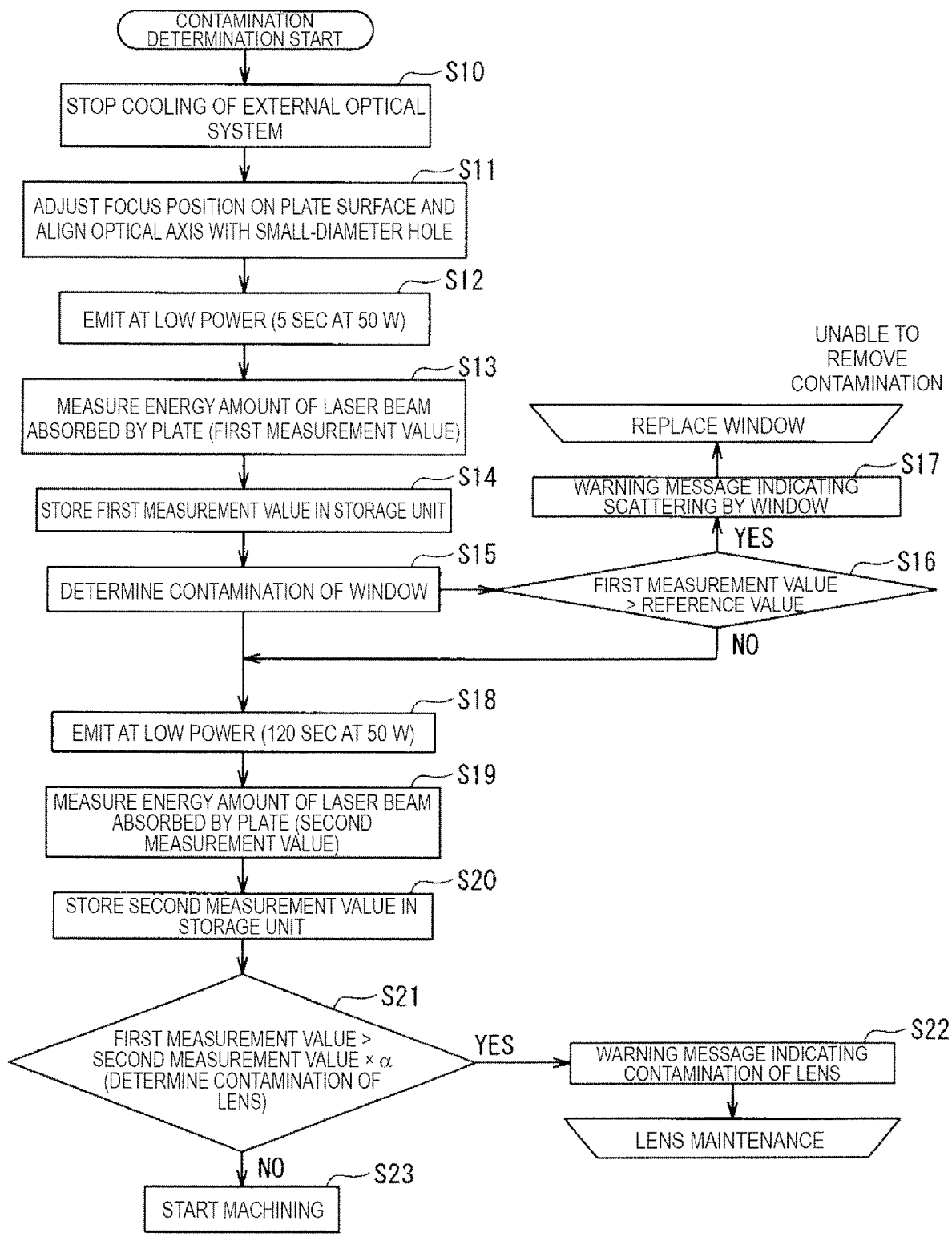
FIG. 5 is a flowchart illustrating operations of the laser machining device according to one embodiment.

FIG. 5 is a flowchart illustrating operations of the laser machining device 10 according to the present embodiment. A process of determining contamination of the external optical system will be described next with reference to FIGS. 4 and 5. Once the contamination determining part 21 has started the determination of contamination before laser machining, in step S10, the cooling stop commanding section 30 commands the cooling control unit 13 to stop cooling the external optical system 12 so that the external optical system 12 is heated by a low power laser beam being emitted for a comparatively long time. In step S11, the drive commanding section 31 commands the drive control unit 20 to adjust the focus position on the surface of the plate 15 and align the optical axis of the laser beam with the center of the small-diameter hole. In step S12, the low power commanding section 32 commands the laser oscillator 11 to emit the laser beam at low power (e.g., 50 W for five seconds). In step S13, the energy amount measuring part 16 measures the energy amount of the laser beam absorbed by the plate 15 as the first measurement value (e.g., 5 W). In step S14, the storage section 22 stores the first measurement value. In step S15, the window contamination determining section 34 starts the determination of contamination of the window 2. In step S16, the window contamination determining section 34 compares the first measurement value with the predetermined reference value pertaining to the first measurement value (e.g., 5 W). If the first measurement value measured within the laser emission start period in which the external optical system 12 is not heated is greater than the reference value (YES in step S16), the energy amount of the laser beam absorbed by the plate 15 is greater than the normal state, and thus the window contamination determining section 34 determines that contamination of the window 2 is causing the laser beam to scatter and be absorbed by the plate 15. Accordingly, in step S17, the warning unit 35 issues a warning message indicating that the window is causing the laser beam to scatter, prompting an operator to replace the window. In step S16, if the first measurement value measured within the laser emission start period in which the external optical system 12 is not heated is less than or equal to the reference value (NO in step S16), the laser beam is not being absorbed by the plate 15, and thus the window contamination determining section 34 determines that the window 2 is not contaminated. Note that steps S15 to S17, which determine contamination of the window, are optional processes.

In step S18, the low power commanding section 32 commands the laser oscillator 11 to emit the laser beam at low power (e.g., 50 W for 120 seconds). However, the low power commanding section 32 may command the laser beam to be continuously emitted at low power from step S12 to step S18 (i.e., until the external optical system 12 is heated). In step S19, the energy amount measuring part 16 measures the energy amount of the laser beam absorbed by the plate 15 as the second measurement value (e.g., 7 W). In step S20, the storage section 22 stores the second measurement value. In step S21, the lens contamination determining section 33 starts the determination of contamination of the lens 1, and compares the first measurement value measured within the laser emission start period in which the external optical system 12 is not heated with the second measurement value measured within the set time elapsed period in which the external optical system 12 is heated. If a ratio (or difference) between the first measurement value, which is the energy amount of the laser beam absorbed by the plate 15 within the laser emission start period in which the external optical system 12 is not heated (e.g., 5 W), and the second measurement value, which is the energy amount of the laser beam absorbed by the plate 15 within the set time elapsed period in which the external optical system 12 is heated (e.g., 7 W), is greater than a predetermined allowable change rate α (or allowable change amount, e.g., 0.8) (YES in step S21), the energy amount absorbed by the plate 15 has increased from the normal state, and thus the lens contamination determining section 33 determines that the thermal lens effect has occurred due to contamination of the lens 1 and the focus position has displaced upward or downward as a result. Accordingly, in step S22, the warning unit 35 issues a warning message indicating that the lens 1 is contaminated, prompting the operator to carry out maintenance on the lens 1. If, in step S21, the ratio (or difference) between the first measurement value, which is the energy amount of the laser beam absorbed by the plate 15 within the laser emission start period in which the external optical system 12 is not heated, and the second measurement value, which is the energy amount of the laser beam absorbed by the plate 15 within the set time elapsed period in which the external optical system 12 is heated, is less than or equal to the predetermined allowable change rate α (or the allowable change amount) (NO in step S21), the energy amount absorbed by the plate 15 has not changed substantially from the normal state, and thus the lens contamination determining section 33 determines that the lens 1 is not contaminated. Accordingly, the laser machining device 10 starts laser machining in step S23. According to the laser machining device 10, contamination of the external optical system 12 can be detected automatically before laser machining, using a configuration that can be retrofitted to an existing laser machining device. As such, maintenance can be carried out on the external optical system 12 without producing a large amount of machining problems.

Figure 6:
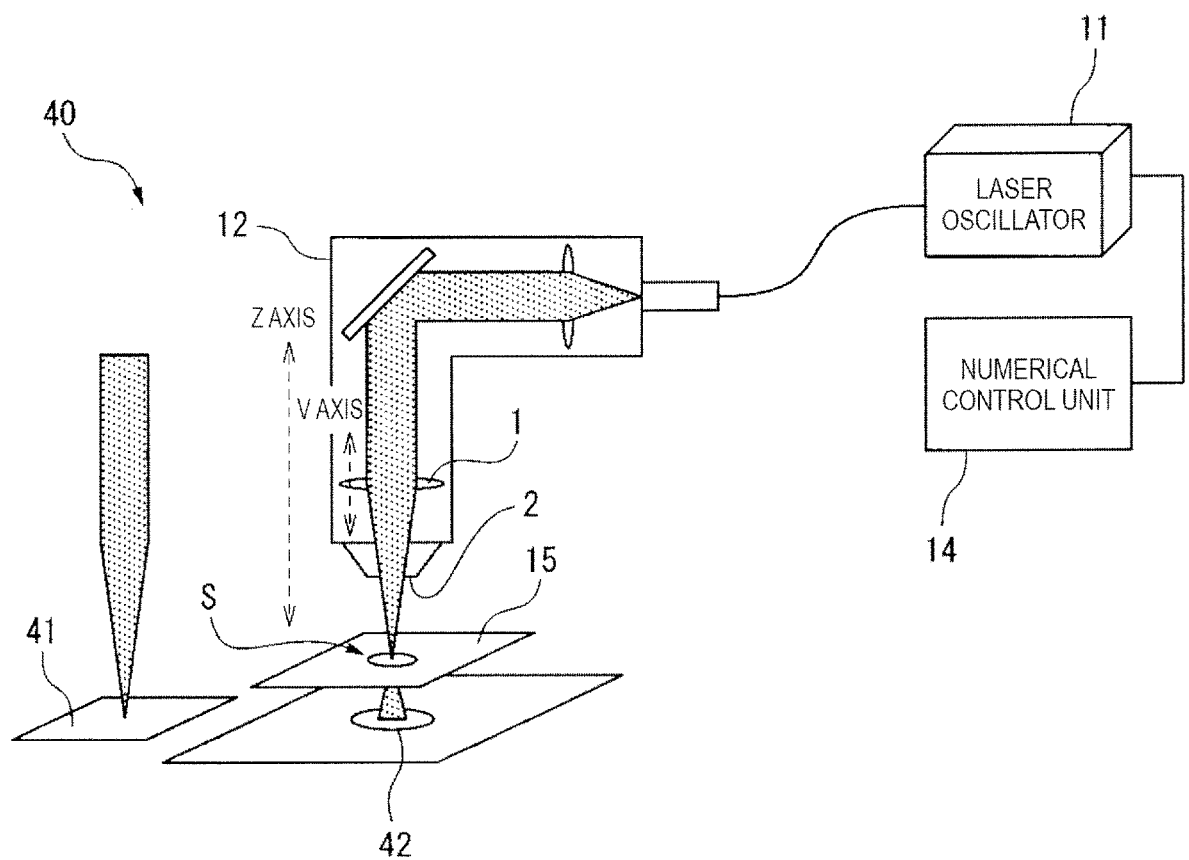
FIG. 6 is a schematic diagram illustrating the overall configuration of a laser machining device according to another embodiment.

FIG. 6 is a schematic diagram illustrating the overall configuration of a laser machining device 40 according to another embodiment. The laser machining device 40 differs from the laser machining device 10 in terms of the configuration for heating the external optical system and the location at which the energy amount of the laser beam is measured. In other words, although the laser machining device 10 heats the external optical system by stopping the cooling of the external optical system 12 and emitting a low power laser beam for a set amount of time, the laser machining device 40 includes a laser beam elimination part 41 capable of removing the laser beam to a location different from the plate 15, and the external optical system is heated by emitting a high power laser beam toward the laser beam elimination part 41. Additionally, although the laser machining device 10 measures the energy amount of the laser beam absorbed by the plate 15 having the small-diameter hole S, the laser machining device 40 measures the energy amount of the laser beam passing through the small-diameter hole S rather than measuring the energy amount of the laser beam absorbed by the plate 15.

The laser machining device 40 includes the laser oscillator 11, the external optical system 12 for guiding the laser beam from the laser oscillator 11 to focus the laser beam onto the surface of a workpiece, and the numerical control unit 14 that controls the laser machining device 10 as a whole. The laser machining device 40 further includes: the plate 15, which is arranged on an outer side of a machining table and has the small-diameter hole S which is, for example, 0.5 mm; an energy amount measuring part 42 that measures the energy amount of the laser beam passing through the small-diameter hole S; and the laser beam elimination part 41, which is arranged in a location different from the plate 15 and is capable of removing the laser beam. The energy amount measuring part 42 may be a thermocouple that measures a heat amount of the laser beam passing through the small-diameter hole S, or may be a power sensor that measures the power of the laser beam passing through the small-diameter hole S. The laser beam elimination part 41 may be an anodized aluminum plate, or may be an optical system such as a mirror that reflects the laser beam to a different location.

Figure 7:
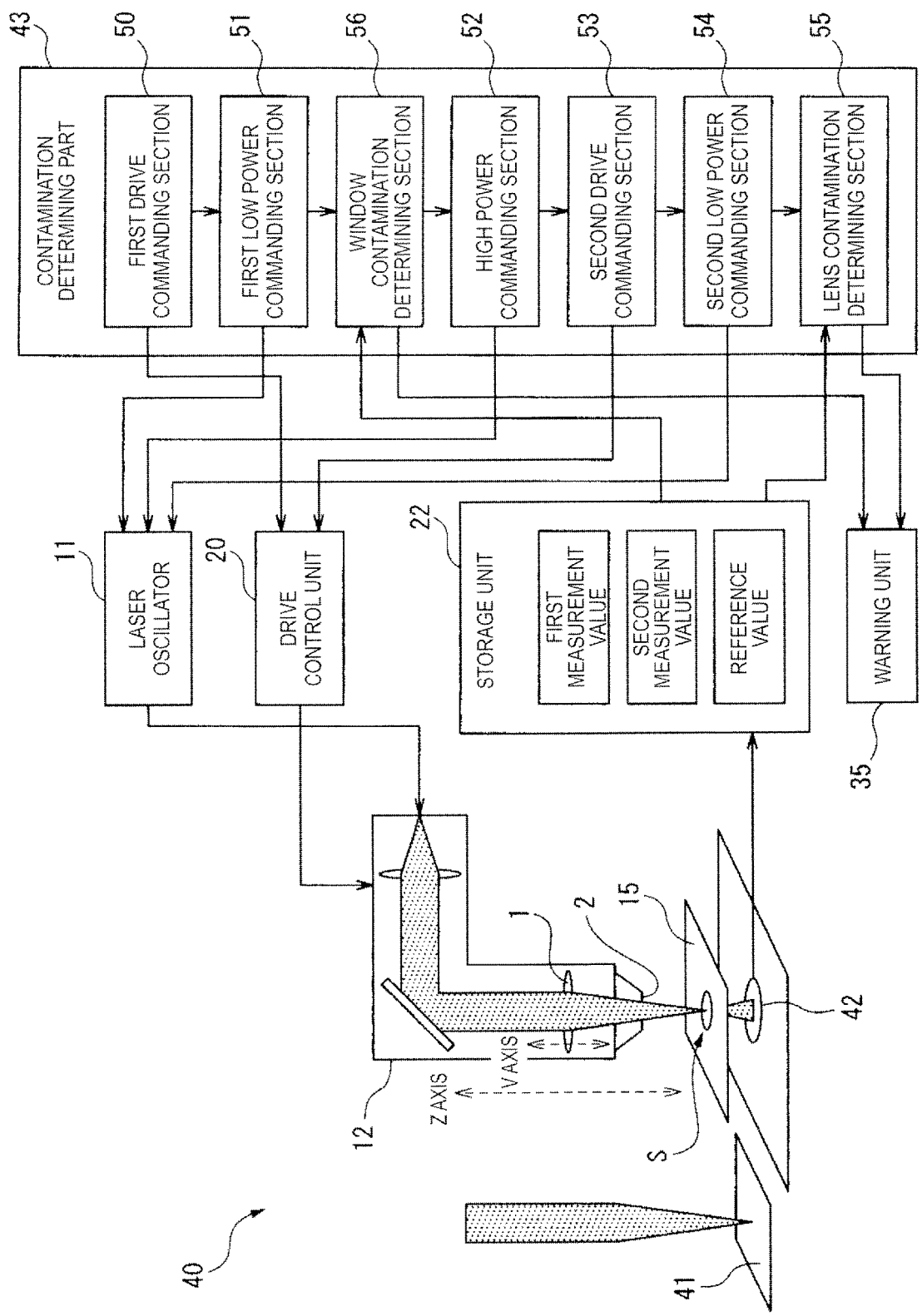
FIG. 7 is a block diagram illustrating the configuration of the laser machining device according to another embodiment.

FIG. 7 is a block diagram illustrating the configuration of the laser machining device 40 according to the other embodiment. The laser machining device 40 further includes: the drive control unit 20 for moving the focus position and optical axis of the laser beam emitted from the external optical system 12; a contamination determining part 43, constituted by a semiconductor integrated circuit such as an ASIC or a FPGA or a program executable by a computer, that determines contamination of the external optical system 12 before the laser machining; and the storage section 22 that stores various types of data. The contamination determining part 43 includes: a first drive commanding section 50 that commands the drive control unit 20 to adjust the focus position on the surface of the plate 15 and align the optical axis of the laser beam with the center of the small-diameter hole S before the external optical system 12 is heated; a first low power commanding section 51 that commands the laser oscillator 11 to emit a laser beam with a low power (e.g., 50 W) to the extent that the plate 15 is not melted or deformed while the external optical system 12 is in an unheated state. The contamination determining part 43 further includes: a high power commanding section 52 that commands the laser oscillator 11 to emit a laser beam toward the laser beam elimination part 41 with a high power to the extent used for laser machining (e.g., 3500 W) so as to heat the external optical system 12; a second drive commanding section 53 that commands the drive control unit 20 to adjust the focus position on the surface of the plate 15 and align the optical axis of the laser beam with the center of the small-diameter hole S after the external optical system 12 has been heated; and a second low power commanding section 54 that commands the laser oscillator 11 to emit the laser beam with a low power to the extent that the plate 15 is not melted or deformed, in a state where the external optical system 12 is heated. The contamination determining part 43 further includes a lens contamination determining section 55 that determines contamination of the lens 1 in the external optical system 12 on the basis of a comparison between a first measurement value, which is measured by the energy amount measuring part 42 in a state where the external optical system 12 is not heated, and a second measurement value, which is measured by the energy amount measuring part 42 in a state where the external optical system 12 is heated. Although an optional component, the contamination determining part 43 may further include a window contamination determining section 56 that determines contamination of the window 2 in the external optical system 12 on the basis of the first measurement value and a predetermined reference value pertaining to the first measurement value. The first measurement value, the second measurement value, and the reference value are stored in the storage section 22. The laser machining device 40 further includes the warning unit 35 that issues a warning message in a case where the lens contamination determining section 55 or the window contamination determining section 56 has determined that the external optical system 12 is contaminated. The warning unit 35 may be a warning lamp, or may be a monitor that displays a warning message in an operation panel.

Figure 8:
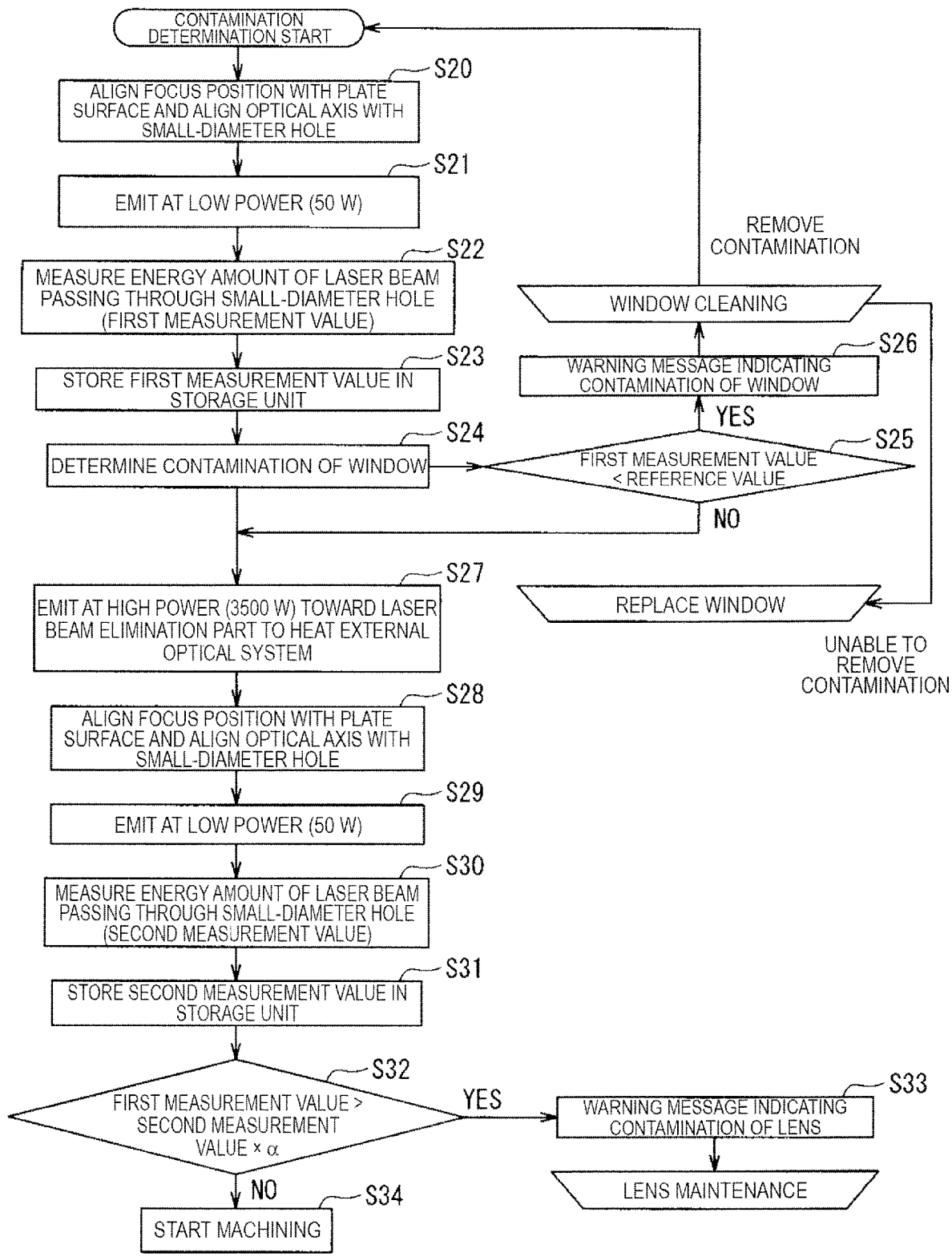
FIG. 8 is a flowchart illustrating operations of the laser machining device according to another embodiment.

FIG. 8 is a flowchart illustrating operations of the laser machining device 40 according to another embodiment. A process of determining contamination of the external optical system will be described next with reference to FIGS. 7 and 8. Once the contamination determining part 43 has started the determination of contamination before laser machining, in step S20, the first drive commanding section 50 commands the drive control unit 20 to adjust the focus position on the surface of the plate 15 and align the optical axis of the laser beam with the center of the small-diameter hole, before the external optical system 12 is heated. In step S21, the first low power commanding section 51 commands the laser oscillator 11 to emit the laser beam at low power (e.g., 50 W). In step S22, the energy amount measuring part 42 measures the energy amount of the laser beam passing through the small-diameter hole S as the first measurement value (e.g., 40 W). In step S23, the storage section 22 stores the first measurement value. In step S24, the window contamination determining section 56 starts the determination of contamination of the window 2. In step S25, the window contamination determining section 56 compares the first measurement value with the predetermined reference value pertaining to the first measurement value (e.g., 45 W). If the first measurement value measured in a state where the external optical system 12 is not heated is lower than the reference value (YES in step S25), the energy amount of the laser beam passing through the small-diameter hole is lower than the normal state, and thus the window contamination determining section 56 determines that contamination of the window 2 is causing the laser beam to be absorbed or scattered. Accordingly, in step S26, the warning unit 35 issues a warning message indicating that the window 2 is contaminated, prompting the operator to clean the window 2. In a case where the operator has cleaned the window 2 and successfully removed the contamination, the contamination determining part 43 starts the determination of contaminating again. In a case where the contamination cannot be removed even after the operator has cleaned the window 2, the window 2 is replaced. If, in step S25, the first measurement value measured in a state where the external optical system 12 is not heated is greater than or equal to the reference value (NO in step S25), the energy amount of the laser beam passing through the small-diameter hole S has not decreased, and thus the window contamination determining section 56 determines that the window 2 is not contaminated. Note that steps S24 to S26, which determining contamination of the window, are optional processes.

In step S27, the high power commanding section 52 commands the laser oscillator 11 to emit a laser beam at a high power (e.g., 3500 W) toward the laser beam elimination part 41 in order to heat the external optical system 12. In step S28, the second drive commanding section 53 commands the drive control unit 20 to adjust the focus position on the surface of the plate 15 and align the optical axis of the laser beam with the center of the small-diameter hole after the external optical system 12 has been heated. In step S29, the second low power commanding section 54 commands the laser oscillator 11 to emit the laser beam with a low power (e.g., 50 W) that the plate 15 is not melted or deformed, in a state where the external optical system 12 is heated. In step S30, the energy amount measuring part 42 measures the energy amount of the laser beam passing through the small-diameter hole S as the second measurement value (e.g., 30 W). In step S31, the storage section 22 stores the second measurement value. In step S32, the lens contamination determining section 55 starts the determination of contamination of the lens 1, and compares the first measurement value, which has been measured in a state where the external optical system 12 is not heated, with the second measurement value, which has been measured in a state where the external optical system 12 is heated. If a ratio (or difference) between the first measurement value, which is the energy amount of the laser beam passing through the small-diameter hole S in a state where the external optical system 12 is not heated (e.g., 40 W), and the second measurement value, which is the energy amount of the laser beam passing through the small-diameter hole in a state where the external optical system 12 is heated (e.g., 30 W), is greater than a predetermined allowable change rate $\alpha$ (or allowable change amount, e.g., 1.2) (YES in step S31), the energy amount passing through the small-diameter hole has decreased from the normal state, and thus the lens contamination determining section 55 determines that the thermal lens effect has occurred due to contamination of the lens 1 and the focus position has displaced upward or downward as a result. Accordingly, in step S33, the warning unit 35 issues a warning message indicating that the lens 1 is contaminated, prompting the operator to carry out maintenance on the lens 1. If, in step S32, the ratio (or difference) between the first measurement value, which is the energy amount of the laser beam passing through the small-diameter hole S in a state where the external optical system 12 is not heated (e.g., 40 W), and the second measurement value, which is the energy amount of the laser beam passing through the small-diameter hole in a state where the external optical system 12 is heated (e.g., 30 W), is less than or equal to the predetermined allowable change rate α (or allowable change amount, e.g., 1.2) (NO in step S32), the energy amount passing through the small-diameter hole has not changed substantially from the normal state, and thus the lens contamination determining section 55 determines that the lens 1 is not contaminated. Accordingly, the laser machining device 40 starts laser machining in step S33. According to the laser machining device 40, contamination of the external optical system 12 can be detected automatically before laser machining, using a configuration that can be retrofitted to an existing laser machining device. As such, maintenance can be carried out on the external optical system 12 without producing a large amount of machining problems.

Figure 9:
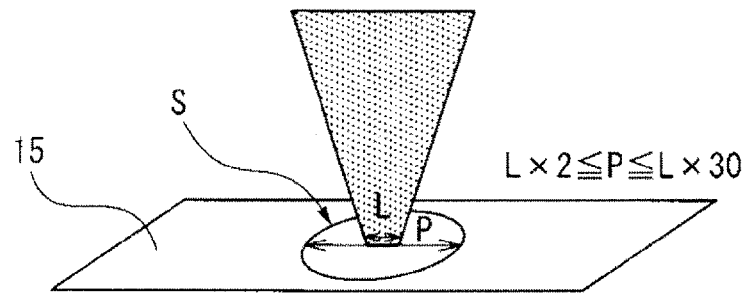
FIG. 9 is a perspective view of a plate, illustrating the diameter of a small-diameter hole according to one embodiment.

FIG. 9 is a perspective view of a plate, illustrating a diameter P of the small-diameter hole S according to the present embodiment. As illustrated in FIG. 9, the diameter P of the small-diameter hole S is preferably greater than or equal to twice and less than or equal to 30 times a focal diameter L of the laser beam. The focal diameter L of a laser beam is generally defined as a width when the intensity has dropped from a peak intensity to an intensity of $1/e^2$ (13.5%), and thus the lower end is comparatively broad. As such, setting the diameter P of the small-diameter hole S to be greater than or equal to twice the focal diameter L of the laser beam means that the laser beam will substantially not hit the plate 15. With the laser oscillator 11 according to the present embodiment, the laser type is not limited, and includes lasers having a variety of focus angles. For example, with a fiber laser, the laser beam has a comparatively low focus angle, but when the focal diameter L is 100 μm and the focus angle is 2.4°, and the focus position shifts by 10 mm due to the thermal lens effect, the focal diameter L becomes approximately 820 μm. Assuming that the diameter P of the small-diameter hole is 30 times the focal diameter L of the laser beam, i.e. 3000 μm, at this time, the laser beam will no longer hit the surface of the plate 15, and the contamination determining part 21 will be unable to determine contamination of the external optical system 12. However, with a $CO_2$ laser, the laser beam has a greater focus angle, and thus a general rules of thumb is that as long as the diameter P of the small-diameter hole is less than or equal to 30 times the focal diameter L of the laser beam, the laser beam will substantially hit the surface of the plate 15 even in the case where the focus position has changed. Thus, the diameter P of the small-diameter hole S is preferably greater than or equal to twice and less than or equal to 30 times the focal diameter L of the laser beam. The provisions regarding the diameter P of the small-diameter hole S can also be applied to the small-diameter hole S according to the other embodiment, described with reference to FIGS. 6 to 8.

Figure 10:
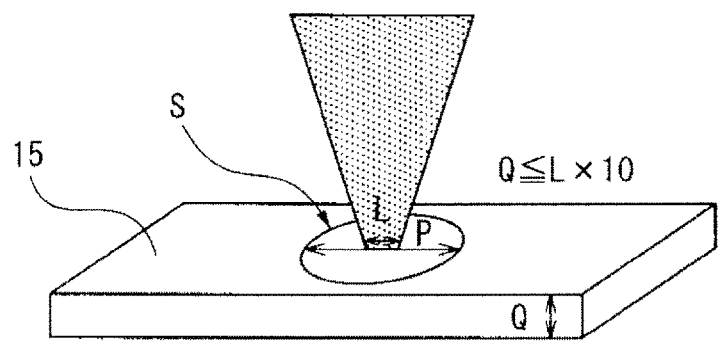
FIG. 10 is a perspective view of a plate, illustrating the thickness of the plate according to one embodiment.

FIG. 10 is a perspective view of the plate 15, illustrating a thickness Q of the plate 15 according to the present embodiment. As illustrated in FIG. 10, the thickness Q of the plate 15 is preferably less than or equal to 10 times the focal diameter of the laser beam. For example, with a fiber laser, which has a comparatively low focus angle, when the diameter P of the small-diameter hole is 200 μm, the focal diameter L is 100 μm, and the thickness Q of the plate 15 is 10 times the focal diameter L, i.e., 1 mm, in a case where the focus position is adjusted on the top face of the plate 15, the diameter of the laser beam at the bottom face of the plate 15, which is distanced by 1 mm, will be 184 μm; the lower end part of the laser beam will not hit the bottom face of the plate 15, and thus the contamination determining part 21 can accurately determine contamination of the external optical system 12. Conversely, in a case where the thickness Q of the plate 15 exceeds 10 times the focal diameter of the laser beam, the laser beam will hit the bottom face of the plate 15 when the focus position is adjusted on the top face of the plate 15, and the contamination determining part 21 will be unable to accurately determine contamination of the external optical system 12. Accordingly, the thickness Q of the plate 15 is preferably less than or equal to 10 times the focal diameter of the laser beam. The provisions regarding the thickness Q of the plate 15 can also be applied to the thickness of the plate 15 according to another embodiment, described with reference to FIGS. 6 to 8.

Figure 11:
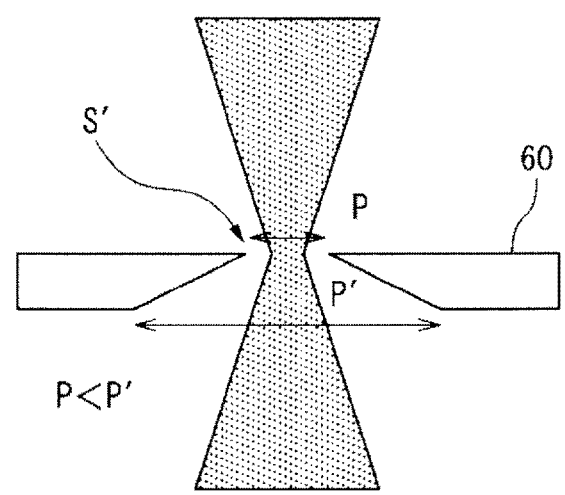
FIG. 11 is a cross-sectional view of a plate, illustrating a small-diameter hole having a tapered shape according to one embodiment.

FIG. 11 is a cross-sectional view of a plate 60, illustrating a small-diameter hole S' having a tapered shape according to another embodiment. The small-diameter hole S' preferably has a tapered shape in which the diameter of the small-diameter hole S' increases as the plate 60 progresses from the top face to the bottom face (P→P'). Accordingly, when the focus position is adjusted on the top face of the plate 60, the lower end of the laser beam will not hit the plate 60 at the bottom face of the plate 60, and the contamination determining part 21 can accurately determine contamination of the external optical system 12. Additionally, in an embodiment where the focus position is adjusted on the bottom face of the plate, the small-diameter hole preferably has a tapered shape such that the diameter of the small-diameter hole increases as the plate progresses from the bottom face to the top face. The provisions regarding the taper-shaped small-diameter hole can also be applied to the small-diameter hole in all of the embodiments described with reference to FIGS. 3 to 8.

A program that can be executed by a computer in the above-described embodiments can be provided having been recorded in a computer-readable non-transitory recording medium, a CD-ROM, etc. Although some embodiments have been described in this specification, the present invention is not intended to be limited to the above-described embodiments, and it is to be understood that many changes can be made without departing from the scope of the appended claims.

The invention claimed is:
1. A laser machining device that performs laser machining on a workpiece after detecting contamination of an optical system, the device comprising:
   a laser oscillator;
   an external optical system configured to guide a laser beam from the laser oscillator to focus the laser beam on a surface of the workpiece;
   a drive control unit configured to move a focus position and an optical axis of the laser beam emitted from the external optical system;
   a cooling control unit configured to control cooling of the external optical system;
   a plate having a small-diameter hole and being capable of absorbing the laser beam;

an energy amount measuring part configured to measure an energy amount of the laser beam absorbed by the plate;

a laser beam elimination part capable of removing the laser beam passing through the small-diameter hole; and a contamination determining part configured to determine contamination of the external optical system before laser machining, wherein the contamination determining part includes:
- a cooling stop commanding section configured to command the cooling control unit to stop cooling the external optical system;
- a drive commanding section configured to command the drive control unit to adjust the focus position on a surface of the plate and align the optical axis of the laser beam with a center of the small-diameter hole;
- a low power commanding section configured to command the laser oscillator to emit the laser beam with a low power to the extent that the plate is not melted or deformed; and
- a lens contamination determining section configured to determine contamination of a lens in the external optical system, based on a comparison between a first measurement value, the first measurement value being measured by the energy amount measuring part within a laser emission start period in which the external optical system is not heated, and a second measurement value, the second measurement value being measured by the energy amount measuring part within a set time elapsed period in which the external optical system is heated.

2. The laser machining device of claim 1, further comprising a shielding part arranged between the plate and the laser beam elimination part and configured to shield reflected light or radiated heat coming from the laser beam elimination part.

3. A laser machining device that performs laser machining on a workpiece after detecting contamination of an optical system, the device comprising:
- a laser oscillator;
- an external optical system configured to guide a laser beam from the laser oscillator to focus the laser beam on a surface of the workpiece;
- a drive control unit configured to move a focus position and an optical axis of the laser beam emitted from the external optical system;
- a plate having a small-diameter hole;
- an energy amount measuring part configured to measure an energy amount of the laser beam passing through the small-diameter hole;
- a laser beam elimination part arranged in a location different from the plate and capable of removing the laser beam; and
- a contamination determining part configured to determine contamination of the external optical system before laser machining, wherein the contamination determining part includes:
- a first drive commanding section configured to command the drive control unit to adjust the focus position on a surface of the plate and align the optical axis of the laser beam with a center of the small-diameter hole before the external optical system is heated;
- a first low power commanding section configured to command the laser oscillator to emit the laser beam with a low power to the extent the plate is not melted or deformed;
- a high power commanding section configured to command the laser oscillator to emit the laser beam toward the laser beam elimination part with a high power to the extent used for laser machining, in order to heat the external optical system;
- a second drive commanding section configured to command the drive control unit to adjust the focus position on the surface of the plate and align the optical axis of the laser beam with the center of the small-diameter hole after the external optical system has been heated;
- a second low power commanding section configured to command the laser oscillator to emit the laser beam with a low power to the extent that the plate is not melted or deformed, in a state where the external optical system is heated; and
- a lens contamination determining section configured to determine contamination of a lens in the external optical system on the basis of a comparison between a first measurement value, the first measurement value being measured by the energy amount measuring part in a state where the external optical system is not heated, and a second measurement value, the second measurement value being measured by the energy amount measuring part in a state where the external optical system is heated.

4. The laser machining device of claim 1, further comprising:
a storage unit storing a predetermined reference value pertaining to the first measurement value,
wherein the contamination determining part further includes a window contamination determining section configured to determine contamination of a window in the external optical system, based on the first measurement value and the reference value.

5. The laser machining device of claim 1, further comprising a warning unit configured to give a warning in the case where it has been determined that the external optical system is contaminated.

6. The laser machining device of claim 1, wherein a diameter of the small-diameter hole is greater than or equal to twice and less than or equal to 30 times a focal diameter of the laser beam.

7. The laser machining device of claim 1, wherein a thickness of the plate is less than or equal to 10 times a focal diameter of the laser beam.

8. The laser machining device of claim 1, wherein the diameter of the small-diameter hole increases from a top face of the plate toward a bottom face of the plate or from the bottom face of the plate toward the top face of the plate.

* * * * *